E. TRUMBO.
Cultivator.

No. 209,366. Patented Oct. 29, 1878.

Attest:
Wm Gilman
O. L. Parrish

INVENTOR:
Elias Trumbo

UNITED STATES PATENT OFFICE.

ELIAS TRUMBO, OF RUTLAND, ILLINOIS.

IMPROVEMENT IN CULTIVATORS.

Specification forming part of Letters Patent No. 209,366, dated October 29, 1878; application filed August 1, 1878.

*To all whom it may concern:*

Be it known that I, ELIAS TRUMBO, of Rutland, in the county of La Salle and State of Illinois, have invented a new and useful Improvement in Cultivators; and that the following is a full, clear, and exact description of the same, reference being had to the accompanying drawings, in which—

Figure 1:
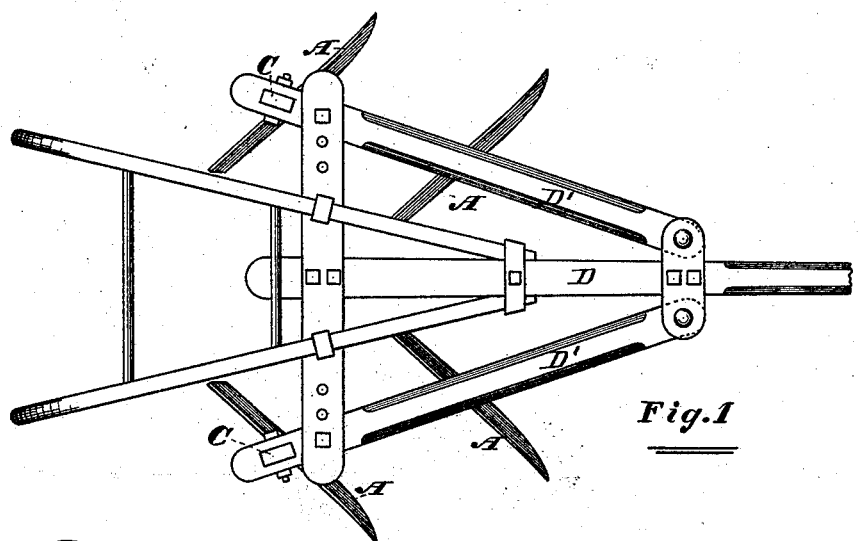
Figure 2:
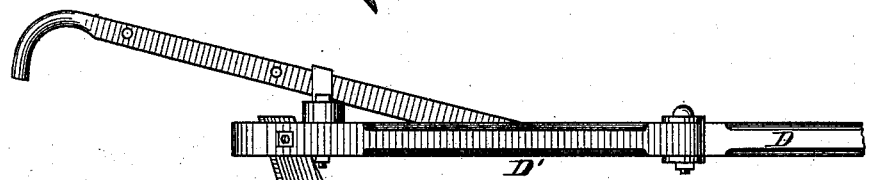
Figure 3:
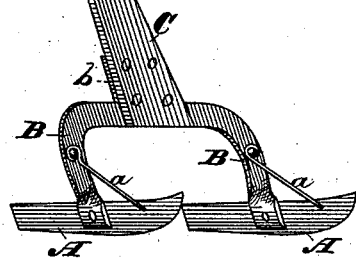

Figure 1 represents a top view or plan of the cultivator. Fig. 2 represents a side elevation of the same. Fig. 3 represents, in perspective, the improvement detached from the frame of the cultivator.

My invention relates to cultivators used to cut weeds, and divide and gather soil on the sides of the rows of corn or other plants.

My invention consists in the combination, with the frame of the cultivator and its standards, of independent curved iron frames to carry the shares, each having a perforated stem at the top bent at right angles to the body of said iron frame, and a share with its forward edge circular and braced to the independent iron frame.

By this construction each share of the cultivator can be adapted to operate at a predetermined angle to the others, and a single share can be removed, either for repairs or for a special class of work, the mode of attachment and the form of the share permitting it to remain free from entanglement with corn-stalks, &c., and rendering it very efficient in running over and dividing lumps of soil.

In the drawings, the shares of the cultivator are represented at A. The bottom edge is made slightly curved only; but the forward edge has a sharp curve upward, to readily cut corn-stalks and weeds, or divide other obstructions which would otherwise be dragged or remain unbroken. To each share is attached, near its middle, a curved iron, B, by which it is connected to the standard, and a brace, *a*, attached at one end to the standard, and at the other to the forward end of the share, adds to the union and rigidity of the parts.

The main frame of the cultivator is composed of a central beam, D, and two laterally-adjustable side beams, D', pivoted to its forward portion.

The iron frame B is bent at right angles to form a stem at *b*, by which it is secured to the standard C by two or more bolts, and the standard is united to the side beams of the cultivator-frame in the usual manner. The curved iron frames B of the shares are generally of uniform size, and attached to the standards in pairs; but each one can be removed independently of the other, and be replaced by another of different size, or attached at a different angle, or be dispensed with altogether, thus adapting the apparatus (independently of its main frame) to the cultivation of plants spaced differently from others, and at various stages of their growth.

I am aware that cultivators have been made with shovels or shares attached to the frame each by an independent stem, standard, or bolt, and that said shovels or shares have been curved upward at their forward edge or edges; but they do not accomplish the results above mentioned, and I do not claim this construction or form *per se*.

What I claim is—

The combination, with the side beams, D', of a cultivator and the standard C, attached thereto, of the independent detachable curved irons B, each having a perforated stem, *b*, at the top, bent at right angles to the body of the curved iron, and a share, A, with its forward edge circular and braced to the independent iron B, all constructed and arranged to operate as shown and described.

ELIAS TRUMBO.

Witnesses:
WM. GILMAN,
O. L. PARRISH.